(12) United States Patent
Bollinger et al.

(10) Patent No.: US 12,214,835 B2
(45) Date of Patent: Feb. 4, 2025

(54) MODULAR VEHICLE

(71) Applicant: Bollinger Motors Inc., Oak Park, MI (US)

(72) Inventors: Robert Bollinger, Oak Park, MI (US); Brian Van Batavia, Chelsea, MI (US); Hunter Erdman, Oak Park, MI (US)

(73) Assignee: Bollinger Motors, Inc., Oak Park, MI (US)

( * ) Notice: Subject to any disclaimer, the term of this patent is extended or adjusted under 35 U.S.C. 154(b) by 194 days.

(21) Appl. No.: 17/569,664

(22) Filed: Jan. 6, 2022

(65) Prior Publication Data
US 2022/0212736 A1 Jul. 7, 2022

Related U.S. Application Data

(60) Provisional application No. 63/134,465, filed on Jan. 6, 2021.

(51) Int. Cl.
*B62D 63/02* (2006.01)
*B60K 1/00* (2006.01)
*B60K 1/04* (2019.01)
*B62D 21/17* (2006.01)

(52) U.S. Cl.
CPC .............. *B62D 63/025* (2013.01); *B60K 1/00* (2013.01); *B60K 1/04* (2013.01); *B62D 21/17* (2013.01)

(58) Field of Classification Search
CPC .... B62D 63/025; B62D 21/17; B62D 31/025; B62D 47/003; B60K 1/00; B60K 1/04; B60K 2001/0438
See application file for complete search history.

(56) References Cited

U.S. PATENT DOCUMENTS

| | | | | |
|---|---|---|---|---|
| 7,303,033 B2 * | 12/2007 | Chernoff | ................ | B60L 50/66 296/205 |
| 7,392,122 B2 * | 6/2008 | Pillar | ...................... | B65F 3/043 701/41 |
| 8,950,530 B2 * | 2/2015 | Niedzwiecki | ............ | B60K 6/46 280/33.998 |
| 9,637,190 B2 * | 5/2017 | Pojidaev | ................... | E02F 3/96 |
| 9,694,712 B2 * | 7/2017 | Healy | ..................... | B60L 50/53 |
| 9,845,123 B2 * | 12/2017 | Byrnes | ................... | B60L 50/60 |
| 10,207,757 B2 * | 2/2019 | Scaringe | ............ | G06Q 30/0645 |

(Continued)

FOREIGN PATENT DOCUMENTS

| | | | | |
|---|---|---|---|---|
| KR | 102549880 B1 * | 7/2023 | | |
| WO | WO-2019224435 A1 * | 11/2019 | ............... | B60J 5/02 |
| WO | WO-2023087098 A1 * | 5/2023 | ............... | B60K 1/04 |

*Primary Examiner* — James A Shriver, II
*Assistant Examiner* — Michael T. Walsh
(74) *Attorney, Agent, or Firm* — The Dobrusin Law Firm, PC

(57) ABSTRACT

A modular vehicle is generally presented where the modular vehicle is generally configured to be rearranged into different driving, passenger, and storage configurations using a plurality of different modules that interface with a powered chassis. The vehicle may include a plurality of modules arranged on the powered chassis. The modules may vary in size and shape and may be configured to interface with the chassis. The powered chassis is designed to include all power and drivetrain components as well as the wheel connections and wheels, all within a generally flat platform that is intended to support the vehicle modules.

15 Claims, 13 Drawing Sheets

(56) References Cited

U.S. PATENT DOCUMENTS

| | | | |
|---|---|---|---|
| 10,479,427 B2* | 11/2019 | Scaringe | B60K 1/04 |
| 11,370,346 B2* | 6/2022 | Castillo | B62D 63/025 |
| 11,752,916 B2* | 9/2023 | Glatfelter | B60F 5/02 410/2 |
| 11,897,563 B2* | 2/2024 | Caynak | B62D 49/02 |
| 12,005,979 B2* | 6/2024 | Moarefi | B60P 1/6436 |
| 2021/0053633 A1* | 2/2021 | Claesson | B60R 16/023 |
| 2024/0166280 A1* | 5/2024 | Lee | B62D 33/04 |

* cited by examiner

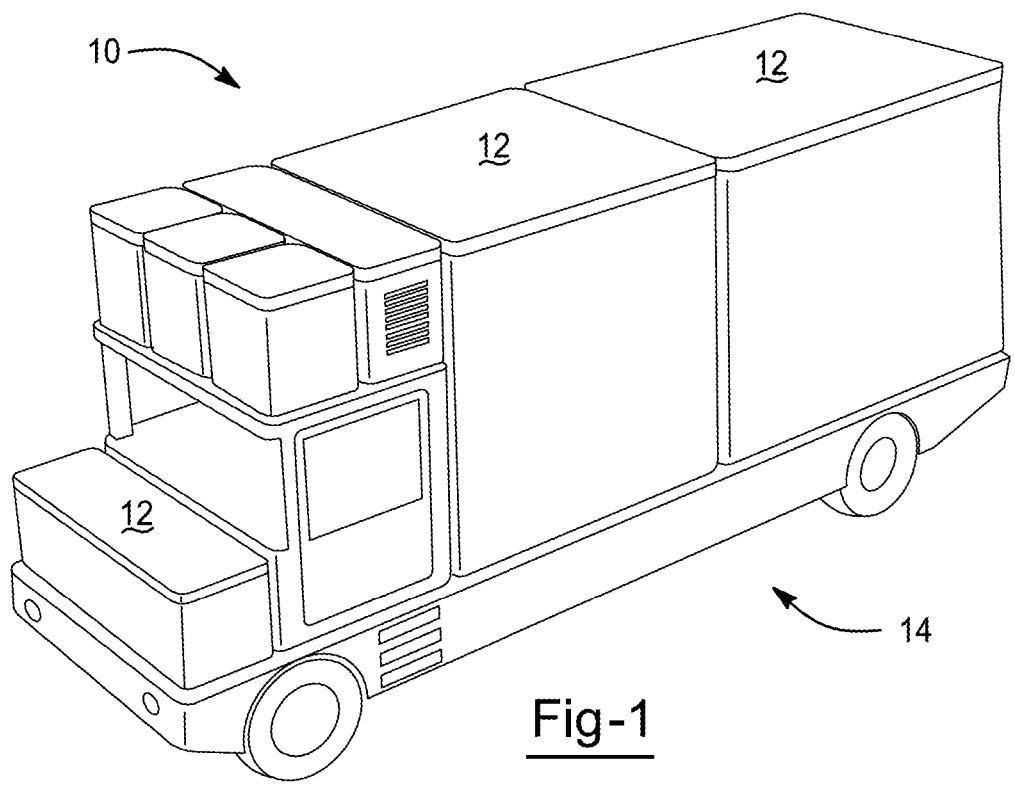
Fig-1
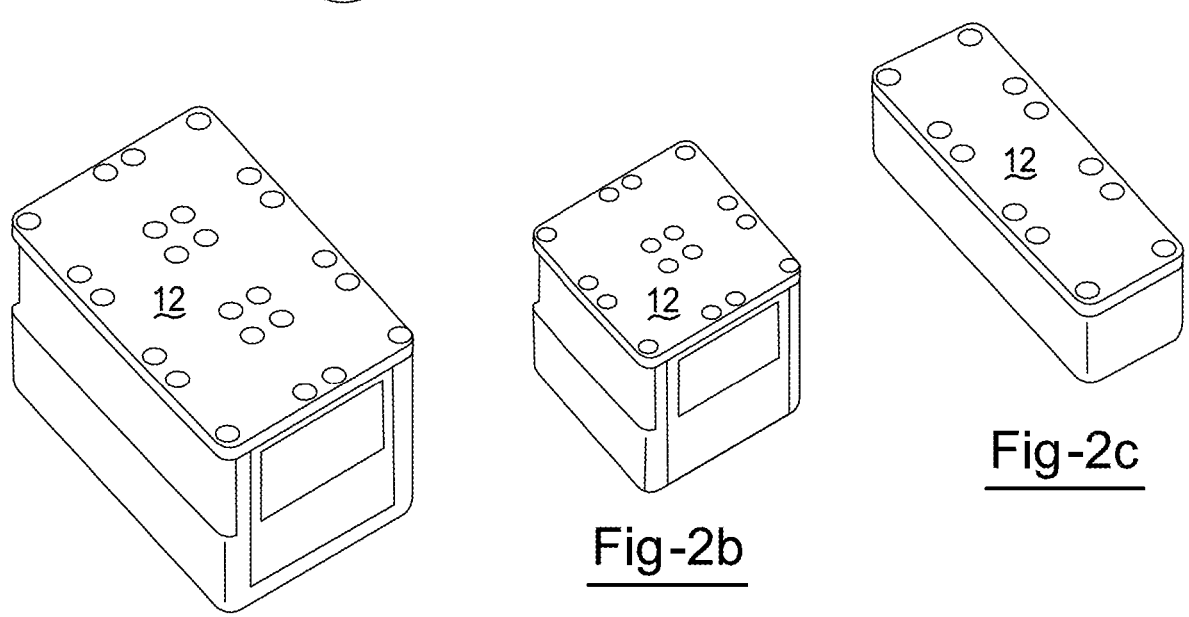
Fig-2a
Fig-2b
Fig-2c
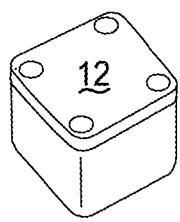
Fig-2d

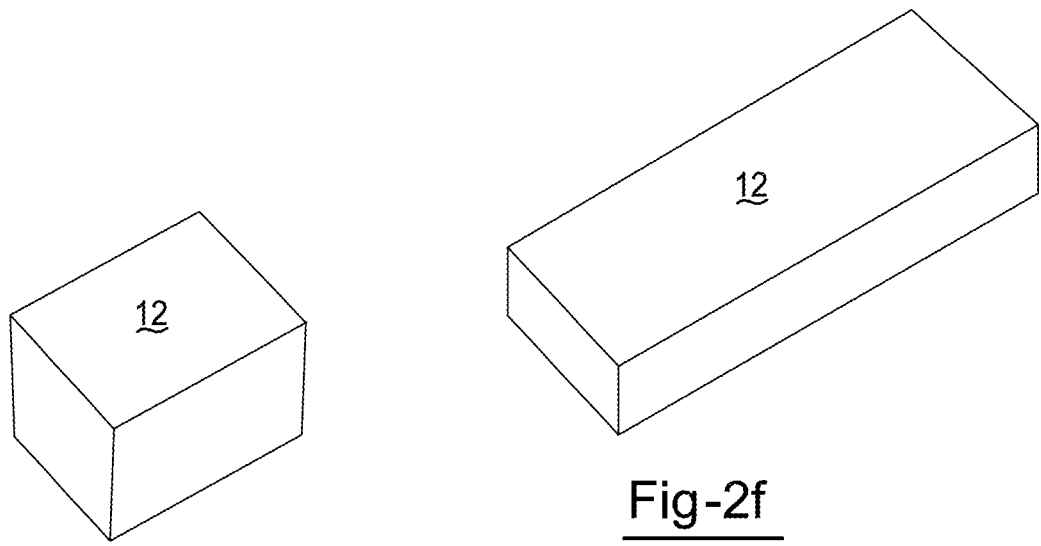
Fig-2e
Fig-2f
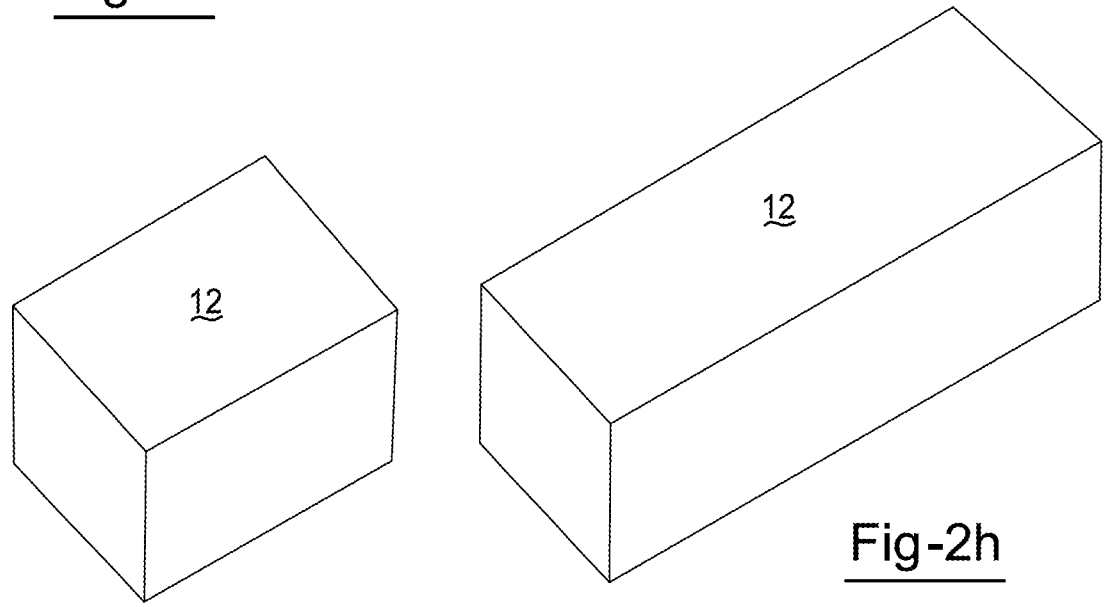
Fig-2g
Fig-2h

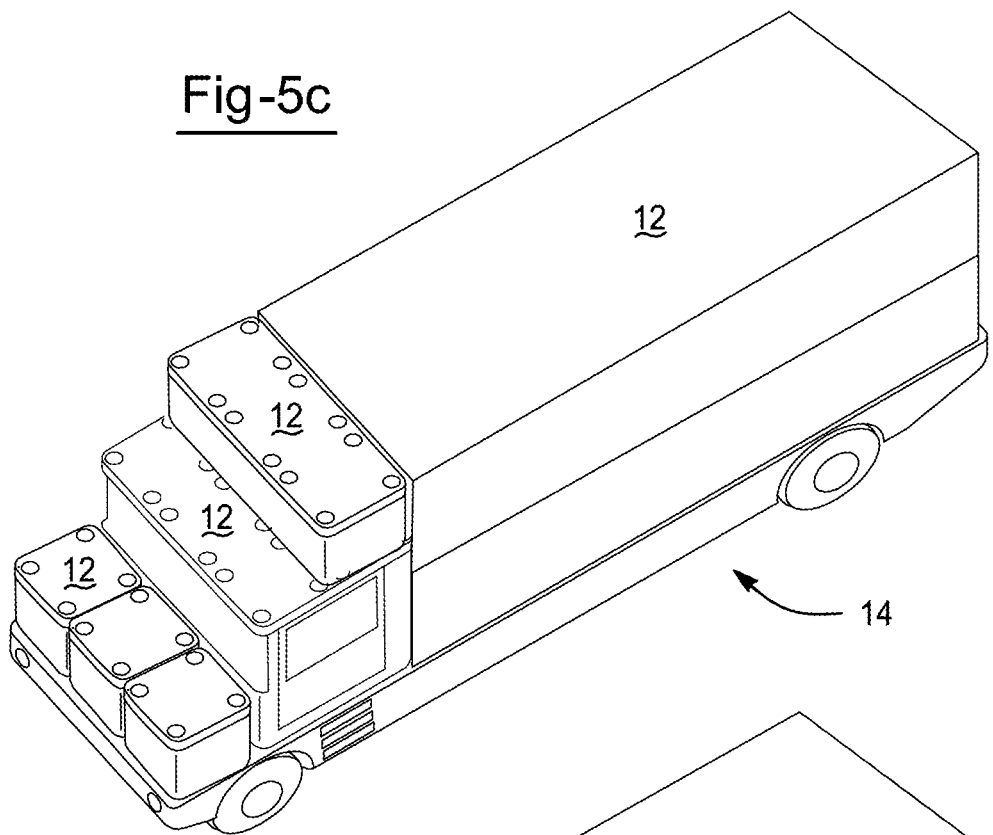
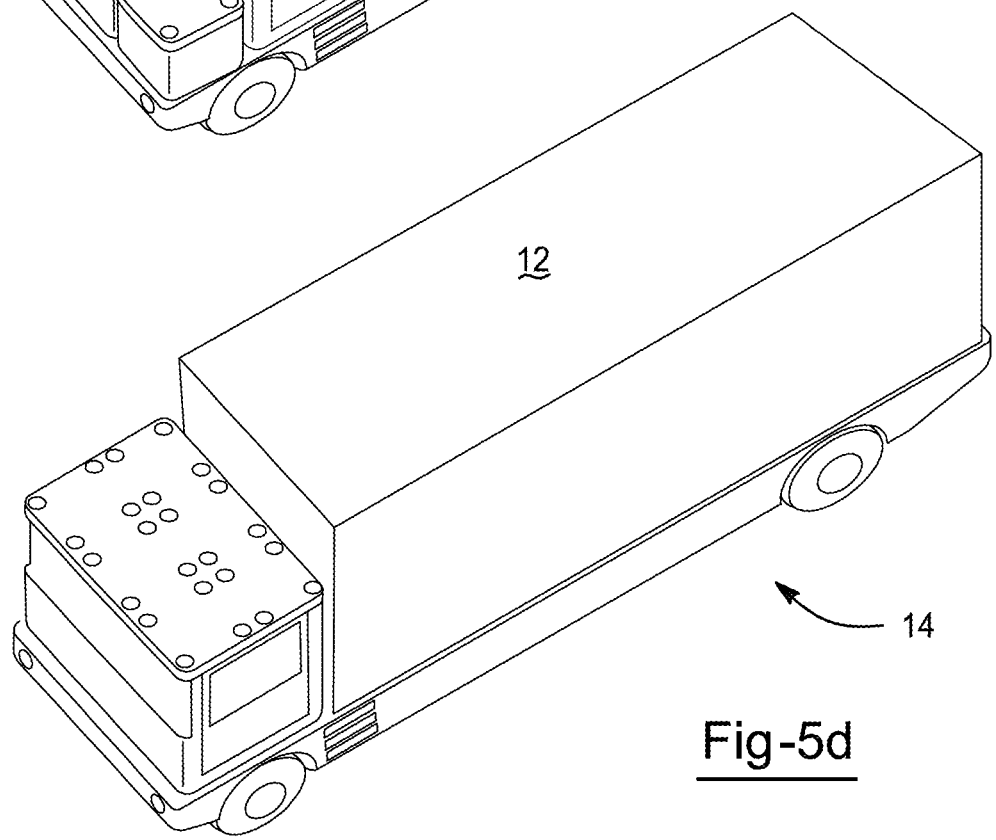

| PACK SIZE 90% DOD | | | 134 121 | | 268 241 | | 402 362 | |
|---|---|---|---|---|---|---|---|---|
| CLASS 3 | 0.9 | 0.3 | 134 | 402 | – | – | – | – |
| CLASS 4 | 1.0 | 0.5 | 121 | 241 | 241 | 482 | – | – |
| CLASS 5 | 1.1 | 0.7 | 110 | 574 | 219 | 345 | – | – |
| CLASS 6 | 1.2 | 0.8 | 101 | 151 | 201 | 302 | 302 | 452 |
| CLASS 7 | 1.2 | 0.8 | 101 | 151 | 201 | 302 | 302 | 452 |
Fig-13
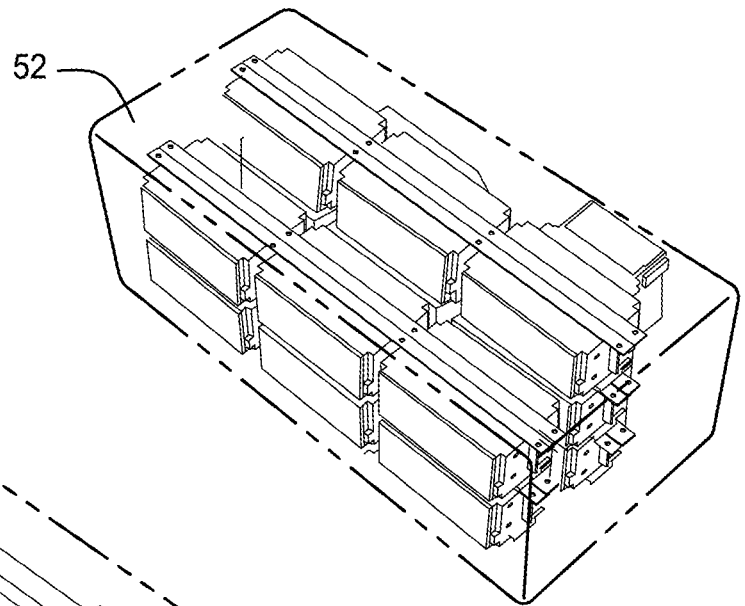
Fig-14
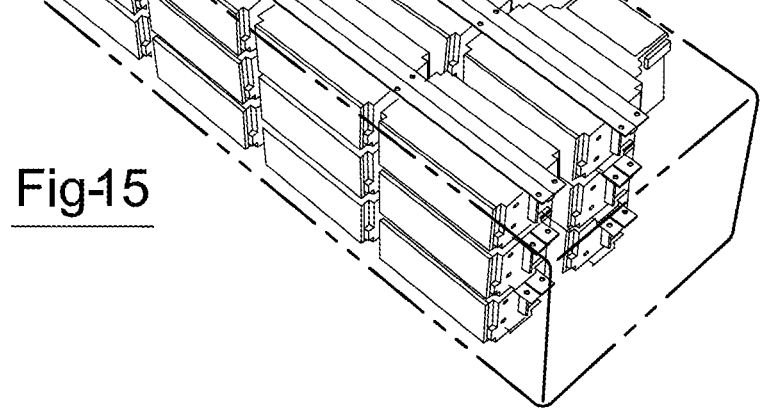
Fig-15

MODULAR VEHICLE

CROSS REFERENCE TO RELATED APPLICATIONS

This application claims priority and benefit to Provisional Patent Application Ser. No. 63/134,465 filed on Jan. 6, 2021.

FIELD OF INVENTION

The field of invention relates generally to a modular vehicle and more specifically to a vehicle having modular and interchangeable cab, storage, and power components.

BACKGROUND

Traditionally, automotive vehicles were designed with an internal combustion engine that occupied a front (or sometimes rear) portion of the vehicle. The engine was supported by the vehicle frame, and the remaining components of the vehicle, including the cab and storage areas, were uniquely customized to fit around the frame and powertrain.

In recent years, the rise of the electric vehicle has brought about new opportunities for reimagining vehicle design. For example, in some electric vehicles, the powertrain and drive train components are all housed within a base frame or platform, sometimes referred to as a skateboard. The skateboard houses the batteries used for powering the vehicle, the electric motors to drive the wheels, and the wheel connections themselves. The skateboard then includes a flat upper surface for supporting the cab and other storage portions of the vehicle.

One benefit of the skateboard design is that it allows for new and innovative vehicle designs to be realized. However, the stringent and inflexible body arrangement of traditional vehicles restricts the skateboard design from realizing its full use potential.

Accordingly, an improved modular vehicle design needed in the industry.

SUMMARY

A modular vehicle is generally presented where the modular vehicle is generally configured to be rearranged into different driving, passenger, and storage configurations using a plurality of different modules that interface with a powered chassis. The vehicle may include a plurality of modules arranged on the powered chassis. The modules may vary in size and shape and may be configured to interface with the chassis. The powered chassis is designed to include all power and drivetrain components as well as the wheel connections and wheels, all within a generally flat platform that is intended to support the vehicle modules.

A modular vehicle having an electric chassis, the electric chassis holding at least one battery and at least one motor to power the vehicle, the electric chassis having a planar upper surface, at least one repositionable module, and the upper surface having at least one connection pad, the at least one repositionable module configured to connect directly to the connection pad of the electric chassis to facilitate an electric, physical, and/or communication connection. In some embodiments, the electric chassis includes a frame, the planar upper surface connected to the frame. In some embodiments, the connection pad includes electric connections connecting the electric chassis to the at least one repositionable module. In other embodiments, the connection pad includes communications connections connecting the electric chassis to the at least one repositionable module. In other embodiments, the connection pad includes physical connections connecting the electric chassis to the at least one repositionable module. The physical connection may be a lock. In some embodiments, the at least one connection pad is a plurality of connection pads. Further, the at least one modular may be a plurality of modules.

A method of configuring a modular vehicle, the modular vehicle having an electric chassis, the electric chassis holding at least one battery and at least one motor to power the vehicle, the electric chassis having a planar upper surface, at least one repositionable module, and the upper surface having at least one connection pad, the at least one repositionable module configured to connect directly to the connection pad of the electric chassis to facilitate an electric, physical, and/or communication connection, the method includes the step of connecting the at least one module to the connection pad of the upper planar surface. The method may further comprise the step of repositioning the at least one module on the upper planar surface of the electric chassis. The method may further comprise the step of electrically connecting the at least one module to the connection pad of the upper planar surface. The method may further comprise the step of connecting communications the at least one module to the connection pad of the upper planar surface. The method may further comprise the step of physically connecting the at least one module to the connection pad of the upper planar surface.

A modular vehicle comprising a powered chassis, the powered chassis holding at least one motor to power the vehicle, the powered chassis having a planar upper surface, at least one repositionable module, and the upper surface having at least one connection pad, the at least one repositionable module configured to connect directly to the connection pad of the powered chassis to facilitate an electric, physical, and/or communication connection. In some embodiments, the powered chassis includes a frame, the planar upper surface connected to the frame. In other embodiments, the connection pad includes electric connections connecting the powered chassis to the at least one repositionable module. In other embodiments, the connection pad includes communications connections connecting the powered chassis to the at least one repositionable module. In other embodiments, the connection pad includes physical connections connecting the powered chassis to the at least one repositionable module where the physical connection may be a lock. In some embodiments, the at least one connection pad is a plurality of connection pads.

BRIEF DESCRIPTION OF THE DRAWINGS

The operation of the invention may be better understood by reference to the detailed description taken in connection with the following illustrations, wherein:

FIG. 1 illustrates an exemplary modular vehicle having a skateboard base and a plurality of modules connected thereto according to one or more embodiments as shown and described herein;

FIG. 2*a* illustrates an exemplary module for connection to a skateboard platform according to one or more embodiments as shown and described herein;

FIG. 2*b* illustrates an exemplary module for connection to a skateboard platform according to one or more embodiments as shown and described herein;

FIG. 2*c* illustrates an exemplary module for connection to a skateboard platform according to one or more embodiments as shown and described herein;

FIG. 2d illustrates an exemplary module for connection to a skateboard platform according to one or more embodiments as shown and described herein;

FIG. 2e illustrates an exemplary module for connection to a skateboard platform according to one or more embodiments as shown and described herein;

FIG. 2f illustrates an exemplary module for connection to a skateboard platform according to one or more embodiments as shown and described herein;

FIG. 2g illustrates an exemplary module for connection to a skateboard platform according to one or more embodiments as shown and described herein;

FIG. 2h illustrates an exemplary module for connection to a skateboard platform according to one or more embodiments as shown and described herein;

FIG. 5c illustrates an exemplary configuration for a modular vehicle according to one or more embodiments as shown and described herein;

FIG. 5d illustrates an exemplary configuration for a modular vehicle according to one or more embodiments as shown and described herein;

FIG. 13 illustrates a table showing mile range estimates for vehicles depending on vehicle class and battery capacity according to one or more embodiments as shown and described herein;

FIG. 14 illustrates a battery component box and an optional component box according to one or more embodiments as shown and described herein;

FIG. 15 illustrates a battery component box and an optional component box according to one or more embodiments as shown and described herein;

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A modular vehicle is generally presented where the modular vehicle is generally configured to be rearranged into different driving, passenger, and storage configurations using a plurality of different modules that interface with a powered chassis. The vehicle may include a plurality of modules arranged on the powered chassis. The modules may vary in size and shape and may be configured to interface with the chassis. The powered chassis is designed to include all power and drivetrain components as well as the wheel connections and wheels, all within a generally flat platform that is intended to support the vehicle modules.

With reference to FIGS. 1-22, a modular vehicle 10 is generally presented. The modular vehicle 10 is generally configured to be rearranged into different driving, passenger, and storage configurations using a plurality of different modules 12 that interface with a powered chassis 14. As shown in FIGS. 1 and 2a-h, the vehicle may include a plurality of modules 12 arranged on the powered chassis 14. The modules 12 may vary in size and shape and may be configured to interface with the chassis 14, as described in further detail below.

Figure 3:
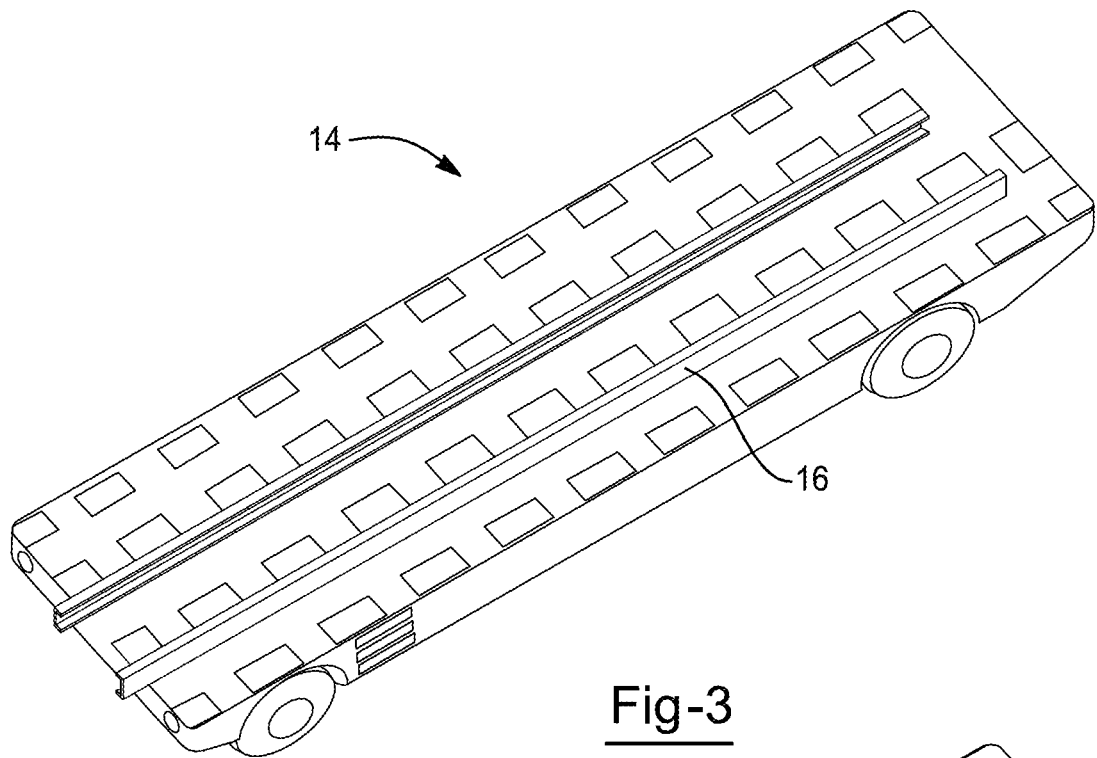
FIG. 3 illustrates a top perspective view of a skateboard platform having a plurality of connection pads according to one or more embodiments as shown and described herein.
Figure 4:
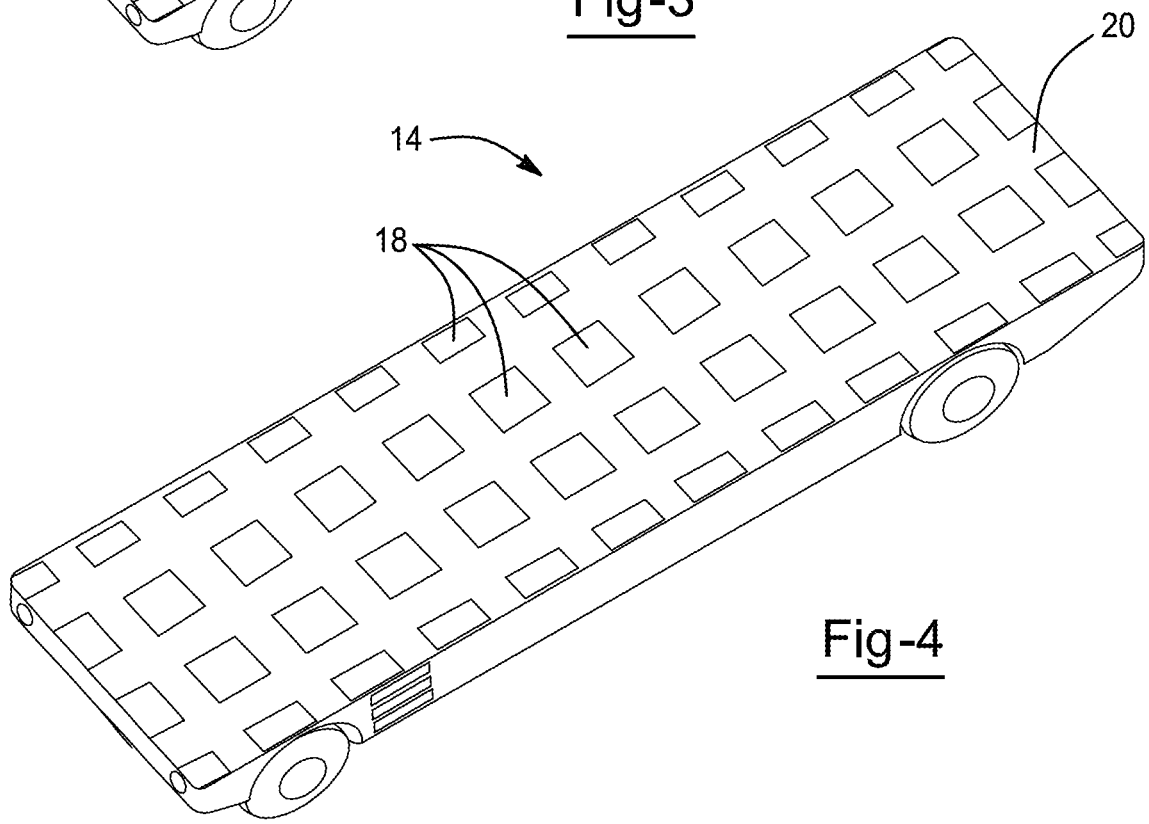
FIG. 4 illustrates a top perspective view of a skateboard platform having a frame and a plurality of connection pads according to one or more embodiments as shown and described herein.
Figure 5A:
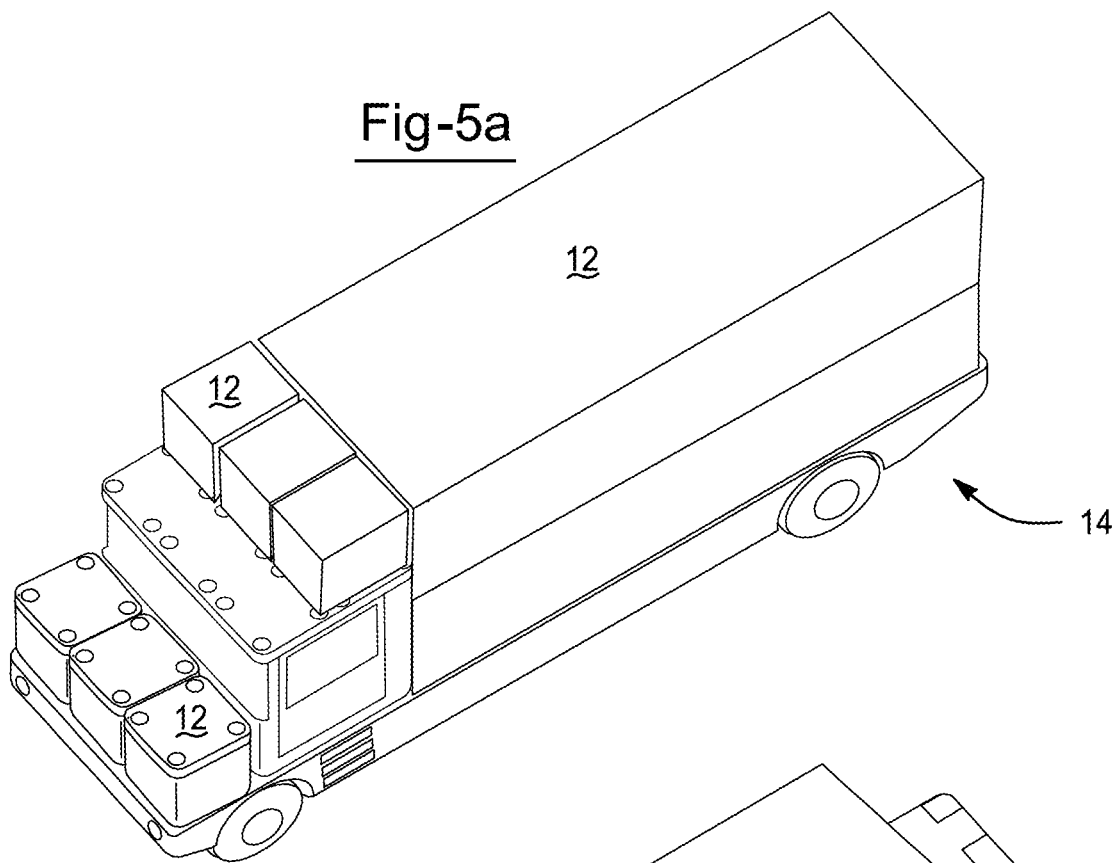
FIG. 5a illustrates an exemplary configuration for a modular vehicle according to one or more embodiments as shown and described herein.
Figure 5B:
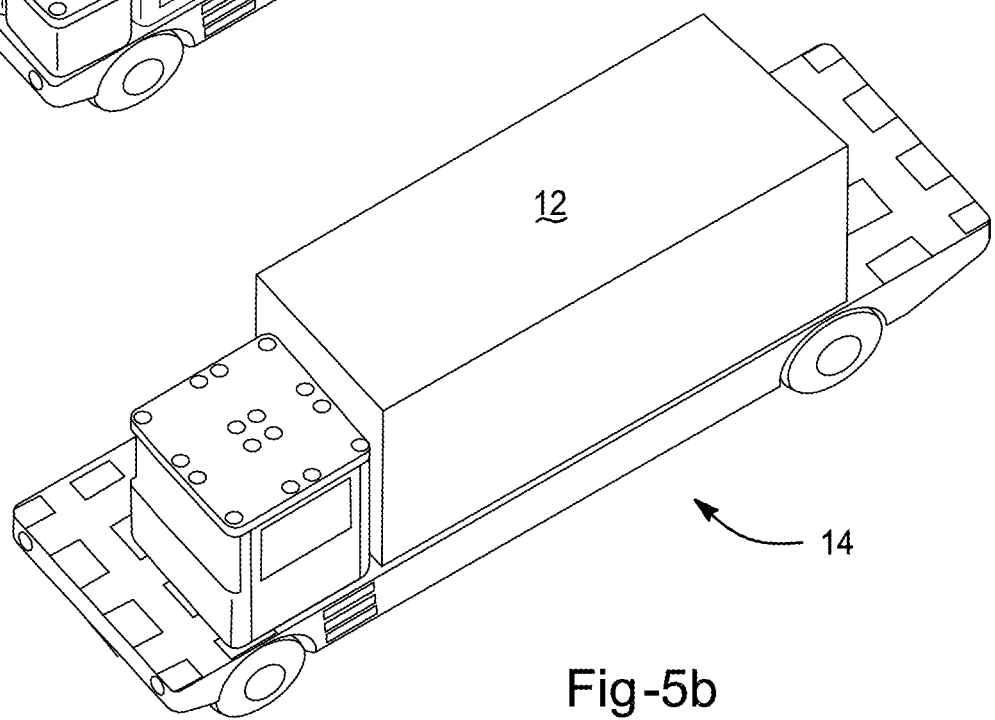
FIG. 5b illustrates an exemplary configuration for a modular vehicle according to one or more embodiments as shown and described herein.
Figure 5E:
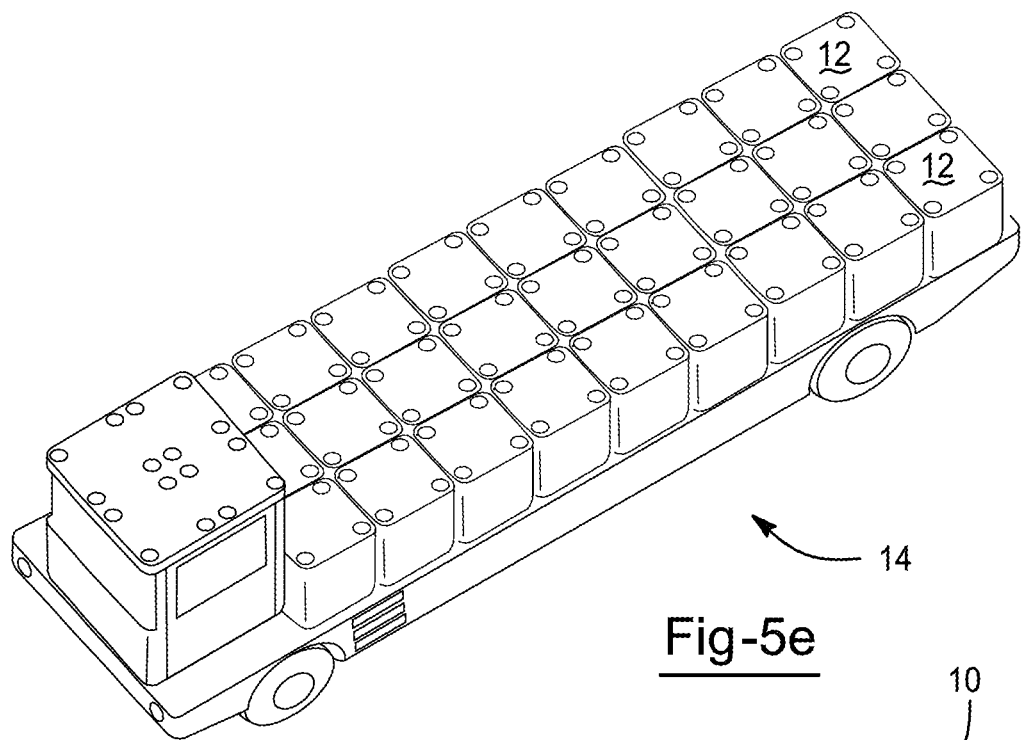
FIG. 5e illustrates an exemplary configuration for a modular vehicle according to one or more embodiments as shown and described herein.

The powered chassis 14 or "skateboard" is shown in FIGS. 3 and 4. The skateboard 14 is designed to include all power and drivetrain components as well as the wheel connections and wheels, all within a generally flat platform that is intended to support the vehicle modules 12. For example, the skateboard may house one or more battery packs, to power one or more electric motors that drive the wheels.

As seen through the partially transparent top in FIG. 3, the skateboard 14 may include a frame 16. The frame 16 may support the various components housed within the skateboard 14 and may facilitate their connection in an optimized and balanced manner, as discussed in further detail below.

As best shown in FIG. 4, the skateboard 14 may include a plurality of connection pads 18. The connection pads 18 may be spaced about a top surface 20 of the skateboard 14 and may generally comprise both physical and electrical and communication connections. The physical connections on each connection pad 18 may include one or more indentations configured to receive similarly shaped protrusions on a module 12 therein. The physical connections may further include any appropriate type of locking and other connection features. The electrical and communication connections may be embedded into the physical connections to provide electrical and communication connections between the module 12 and the skateboard 14. The connection pads 18 may be spaced to facilitate numerous configurations of module 12 arrangements.

It will be appreciated that modules 12 may vary in size and shape, as well as in use and purpose. Without limitation, the modules 12 may include cab modules that are configured to provide passenger seating as well as driving components and other traditional cab amenities. As shown in FIGS. 5a-5e, cab modules 12 may vary in size and shape, such as some cab modules 12 that extend across the entire width of the skateboard 14 while others extend only for a partial width of the skateboard 14. The modules 12 may further include any other type of storage or functional module 12 for use in a variety of vehicle purposes. For example, modules 12 may comprise work modules that are configured to provide storage and other non-vehicle related functions, and other modules 12 may comprise vehicle modules that are configured to provide optional vehicle related functions. Examples of work modules 12 may include storage modules, refrigerated storage modules, passenger modules, and the like. Examples of vehicle modules may include HVAC modules, extra heating modules, inverter modules, winch box modules, genset box modules, and reefer box modules, and the like.

Figure 6:
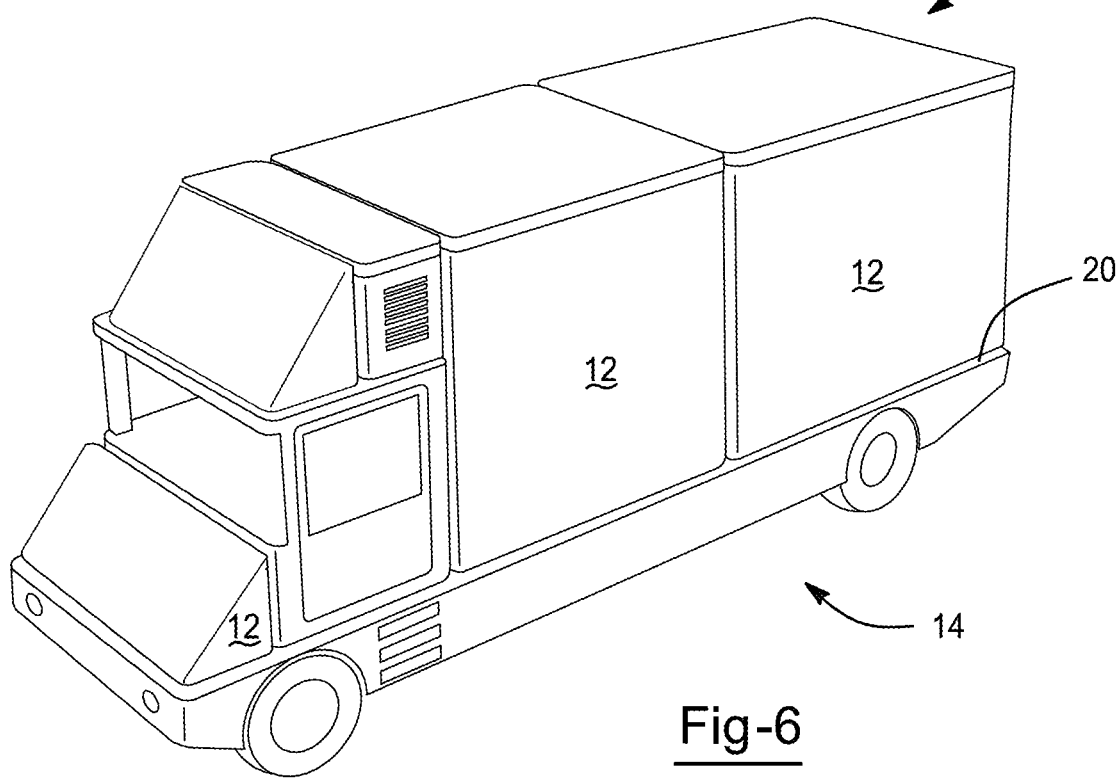
FIG. 6 illustrates a modular vehicle having modules that occupy the entire top surface of the skateboard platform according to one or more embodiments as shown and described herein.
Figure 7:
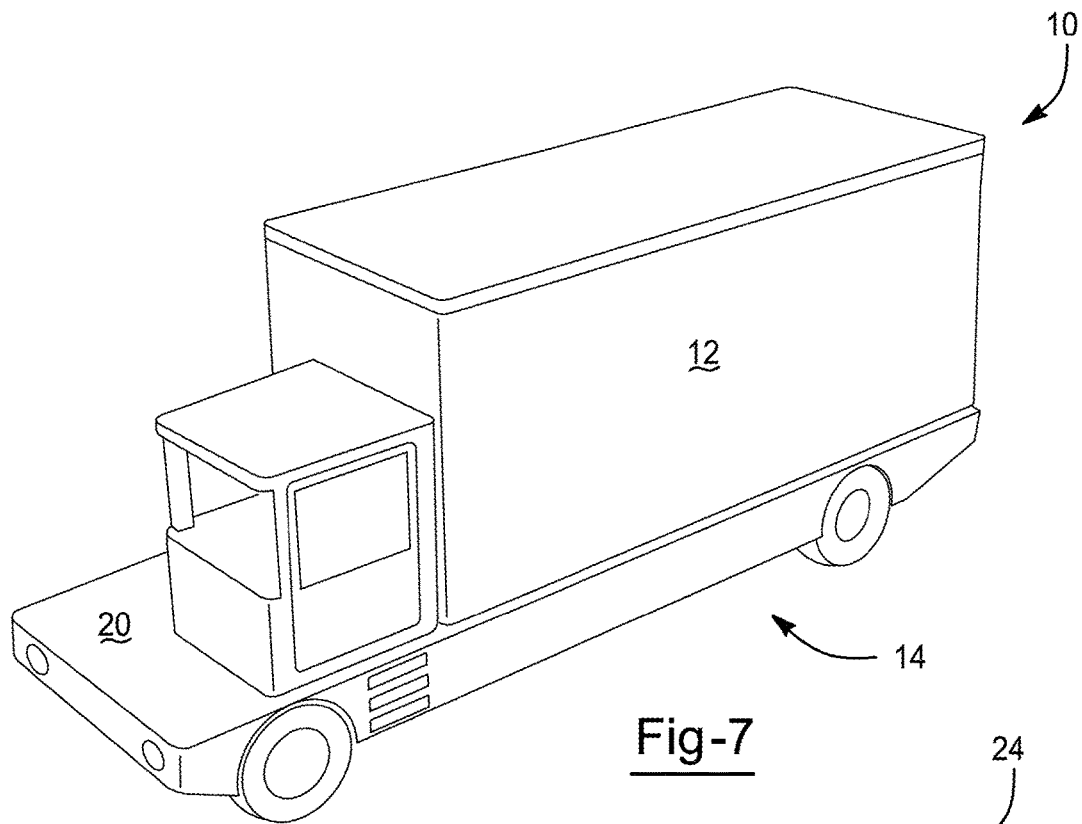
FIG. 7 illustrates a modular vehicle having modules that occupy less than the entire top surface of the skateboard platform according to one or more embodiments as shown and described herein.

In one or more embodiments, the modular vehicle 10 may be configured to function as a cargo hauling vehicle. In such applications, such as shown in FIGS. 6 and 7, the modular vehicle 10 may be configured to resemble a semi-tractor-trailer truck including a cab and one or more trailers (storage modules 12) connected to the skateboard. The modules 12 may occupy the entire top surface 20 of the skateboard 14, as shown in FIG. 6, or may occupy only a part of the top surface 20, as shown in FIG. 7.

In an embodiment, the size and shape of one or more modules 12 may be configured to provide functional benefits. For example, some modules 12 may be shaped and positioned to increase the aerodynamic shape of the modular vehicle 10. As shown in FIG. 6, modules 12 positioned near the front of the vehicle 10 may be slanted or angled to reduce wind resistance or drag. The angled modules 12 may still provide other functionality such as to act as storage or other functional use modules 12. Likewise, some modules 12 may be shaped to better conform to the size and shape of storing and hauling given products. In some embodiments, products may be prestored in a module 12 and configured to be loaded onto a skateboard 14 in a predetermined configuration.

Figure 8:
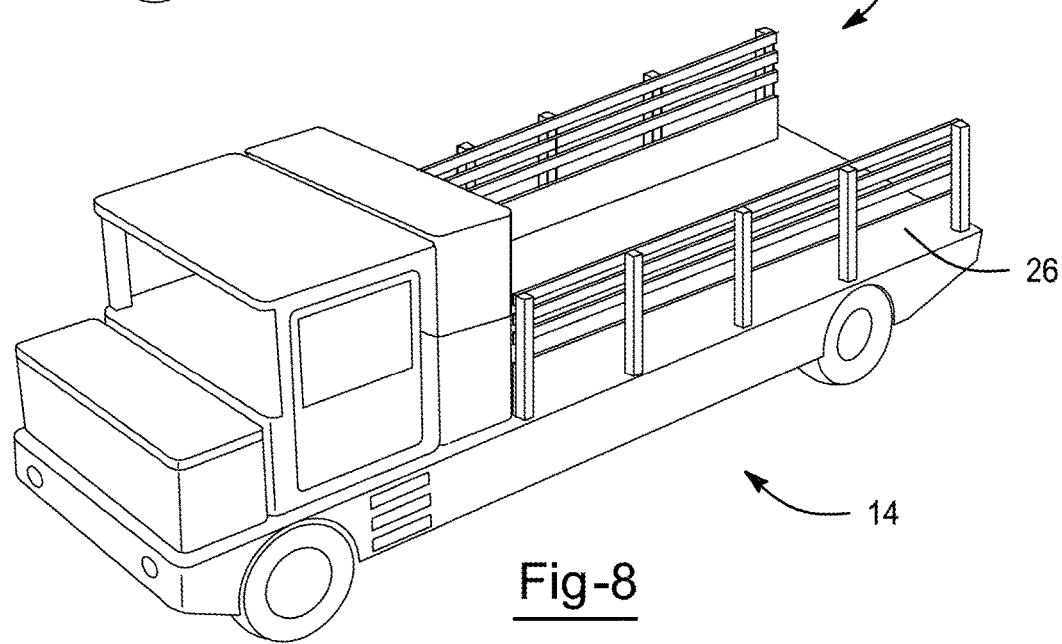
FIG. 8 illustrates a modular vehicle having a gated storage portion according to one or more embodiments as shown and described herein.
Figure 9:
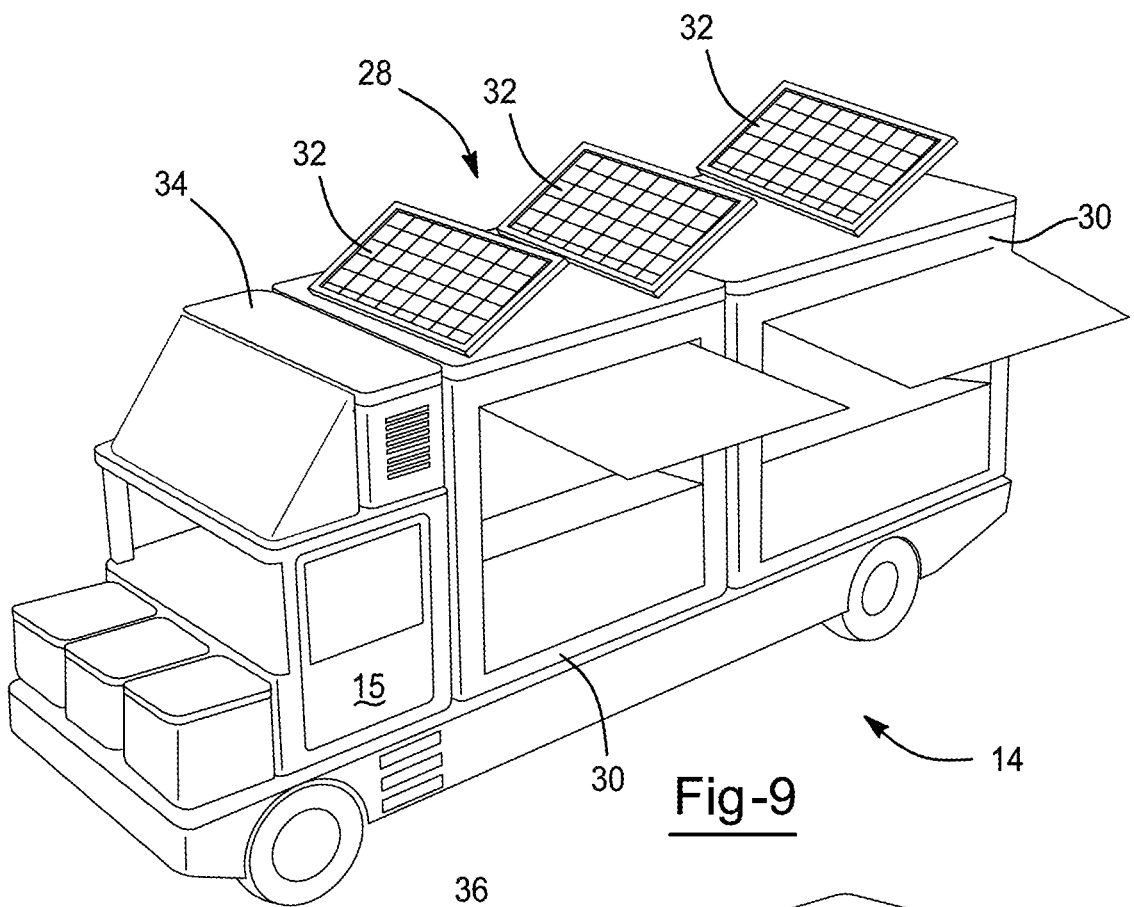
FIG. 9 illustrates a modular vehicle configured to include vending and baking modules with solar power module attachments according to one or more embodiments as shown and described herein.
Figure 10:
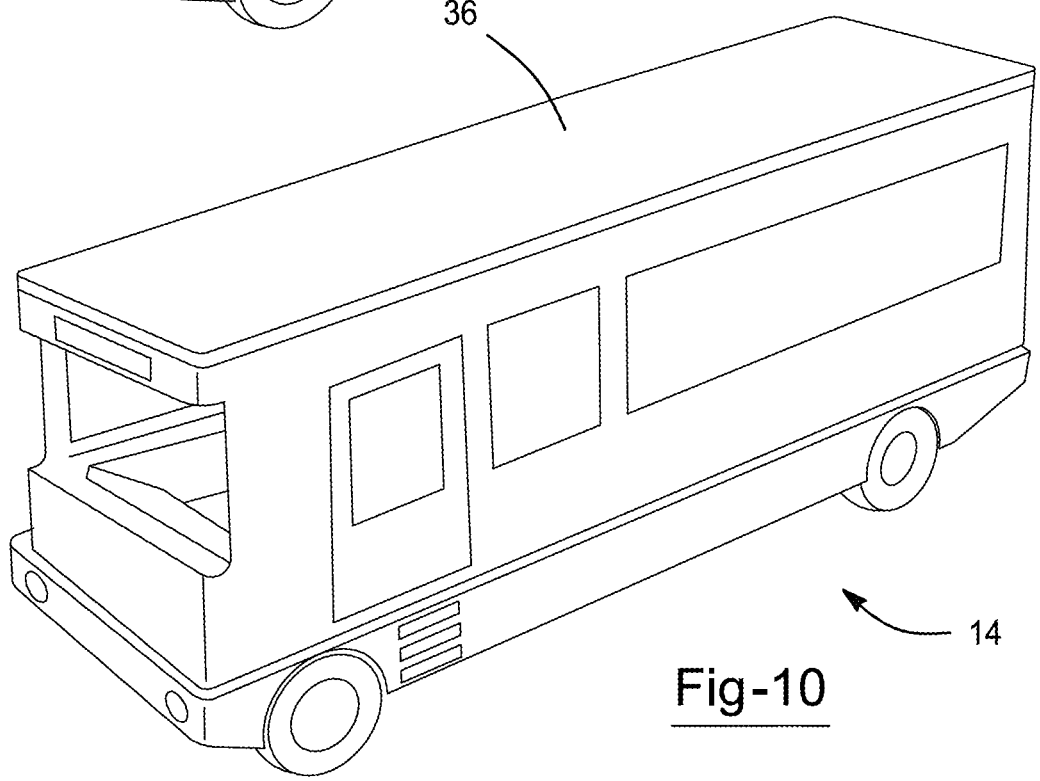
FIG. 10 illustrates a modular vehicle having a mass transit module according to one or more embodiments as shown and described herein.
Figure 11:
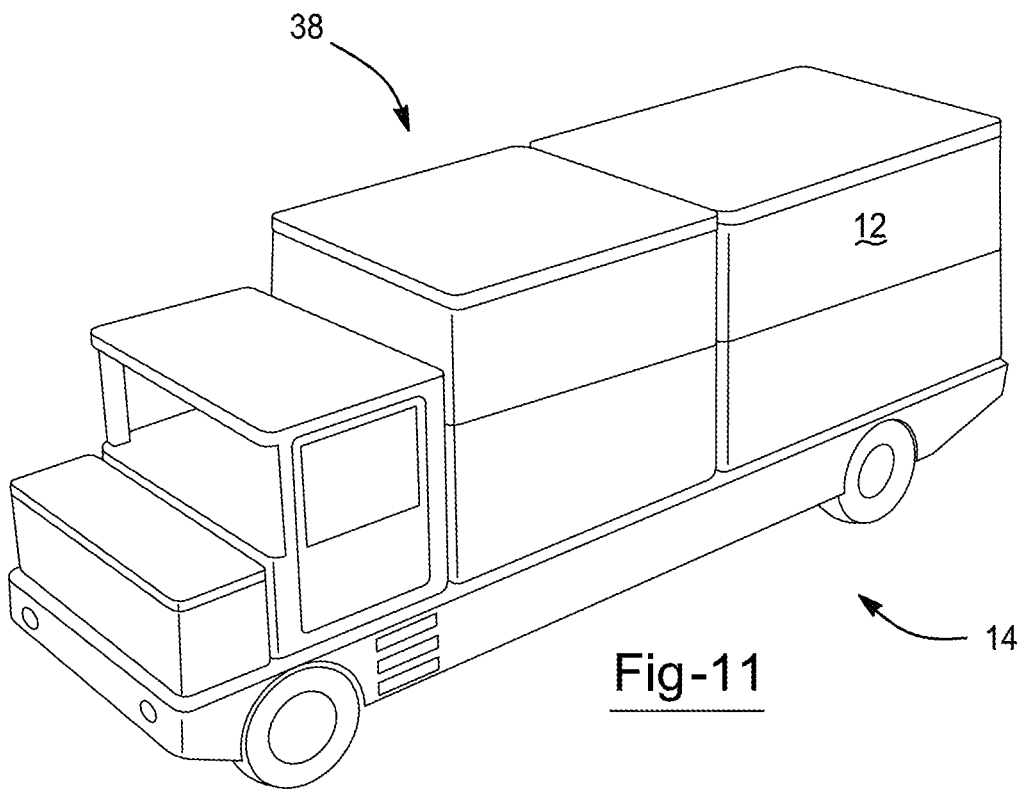
FIG. 11 illustrates a large format modular vehicle configured to hold a plurality of smaller sized storage modules according to one or more embodiments as shown and described herein.

FIGS. 8-11 illustrate various unique configurations of a modular vehicle that may be utilized consistent with the designs provided herein. FIG. 8 illustrates a combined tractor trailer configuration 24 with a fenced in rear storage area 26. FIG. 9 illustrates a food vending configuration 28 that includes a front cab module 15, two vending modules 30 with side windows, solar panels 32 positioned on top of the vending modules 30, and a reefer unit 34 positioned above the cab module 12. FIG. 10 illustrates a mass transit configuration having a bus module 36 positioned on the skateboard 14. The bus module 36 comprises a bus door, windows, and mass transit seating. FIG. 11 illustrates an oversized cargo hauler configuration 38. The oversized hauler 38 may be configured to stack and carry storage modules 12 from a plurality of modular vehicles 10 on a larger skateboard platform 14.

Figure 12:
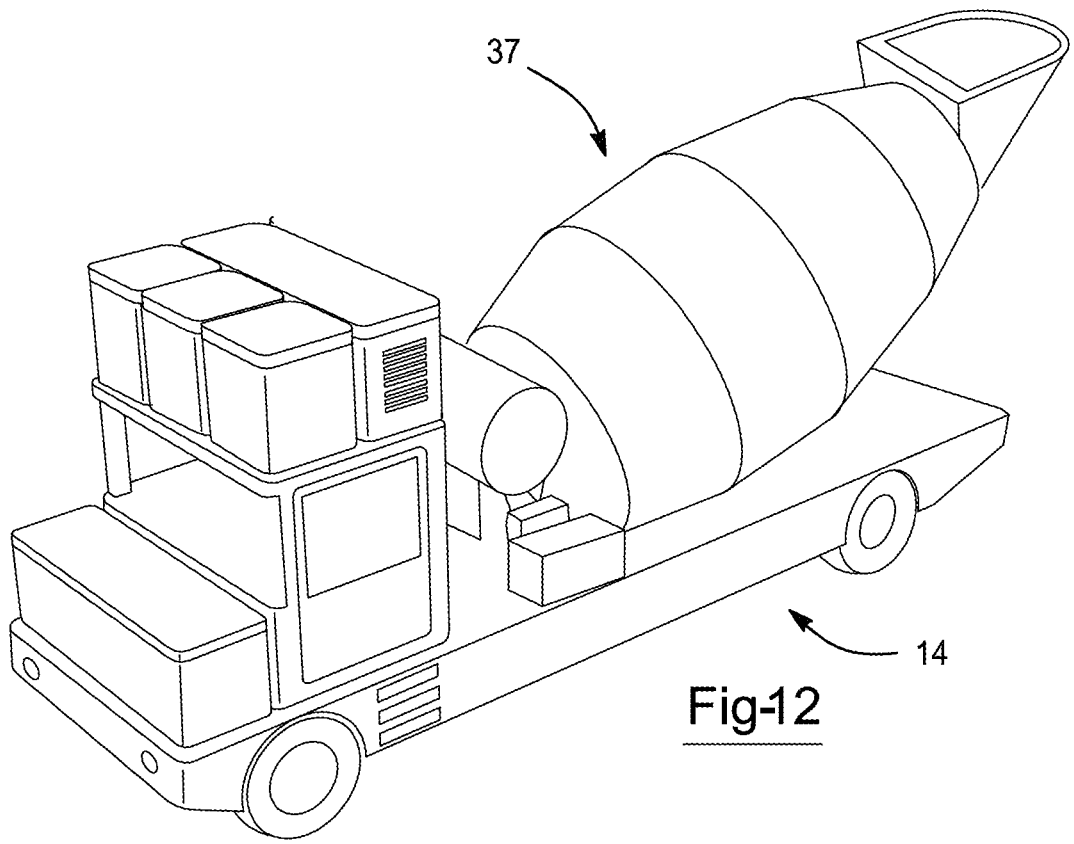
FIG. 12 illustrates a modular vehicle configured to support a cement mixer upfit according to one or more embodiments as shown and described herein.

In an embodiment illustrated in FIG. 12, the skateboard platform 14 may be configured to interface with and control existing or third party upfits 37. For example, as shown, the platform may power and control a cement mixer upfit 37 as shown. However, it will be appreciated that the skateboard 14 may be configured to interface with, control, and support any appropriate upfits 37.

The skateboard platform 14 may also function as powered trailer. For example, the skateboard platform 14 may be connected to a rig or other towing vehicle to be pulled or steered. However, the skateboard platform 14 of the powered trailer may provide power for any necessary purpose, such as for driving or propelling the powered trailer forward or backward in the desired direction or for providing power to storage modules housed on the skateboard 14. The powered trailer may provide numerous benefits over current trailer designs. First, the powered trailer may allow for low power rigs or trucks to pull or steer the trailer by offsetting the total power needed to move the modules 12 on the trailer. Second, the powered trailer may provide power for items stored on the skateboard 14 even when not connected to a rig or other powered vehicle. This may allow trailers with sensitive storage contents to be stored for longer periods of time if necessary. In an embodiment, the powered trailer may further be capable of bidirectional power flow, to allow the skateboard 14 to both power connected modules 12 and to receive power from a separate source. The power source may be any appropriate source, such as another vehicle, a building, or a power grid.

The modular vehicles 10 may utilize different configurations and sizes of battery packs 48 depending on the size of the vehicle and the power needs of the given configuration. The skateboard 14 may be designed with any appropriately sized battery pack or packs 48, such as one or more 67 KWH packs 40, one or more 105 KWH packs 42, one or more 134 KWH packs 44, or one or more 140 KWH packs 46. The skateboard 14 may be loaded with a plurality of packs to provide the desired power capabilities to run the intended modules 12. FIG. 13 shows a table 50 that provides ranges of travel for a vehicle based on the battery pack size and/or number of packs.

The skateboard 14 may be configured to includes various components to monitor and regulate the battery packs. The components may be packaged together, such as in a BHV module 52, such as illustrated in FIG. 14. The BHV module 52 may include, without limitation, one or more battery chargers, voltage converters, high voltage coolant heater and/or chiller, traction motor contactors, and high voltage fuses. The skateboard 14 may optionally further include additional components in a component box 54 such as a hydraulic power unit, air compressor, ground fault detection, voltage and current monitoring and measuring, and a high voltage bus active discharge circuit, such as shown in FIG. 15.

Figure 16:
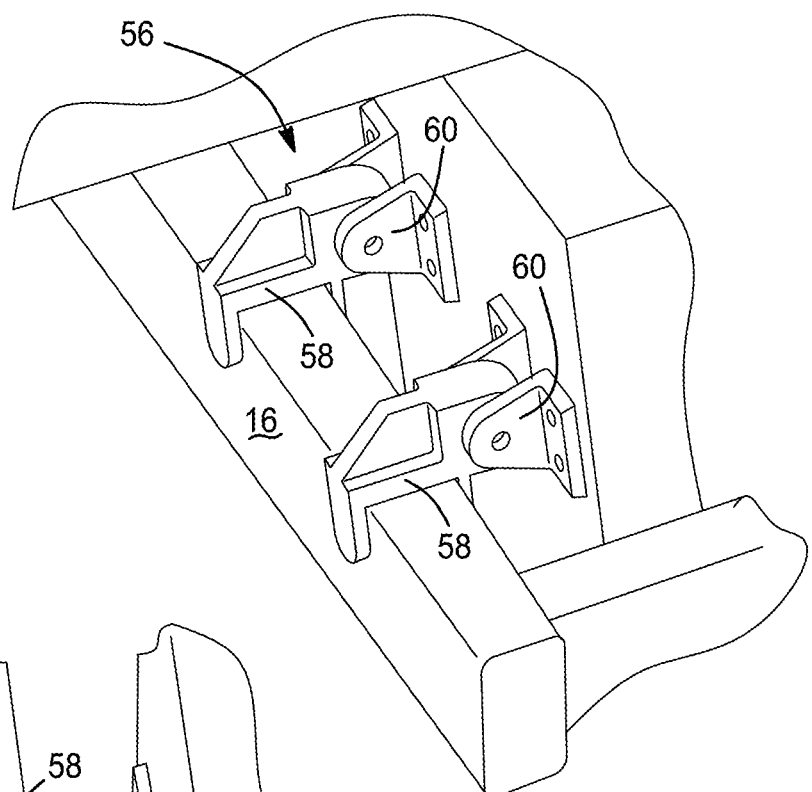
FIG. 16 illustrates a single connection frame mount for a suspended battery connection according to one or more embodiments as shown and described herein.
Figure 17:
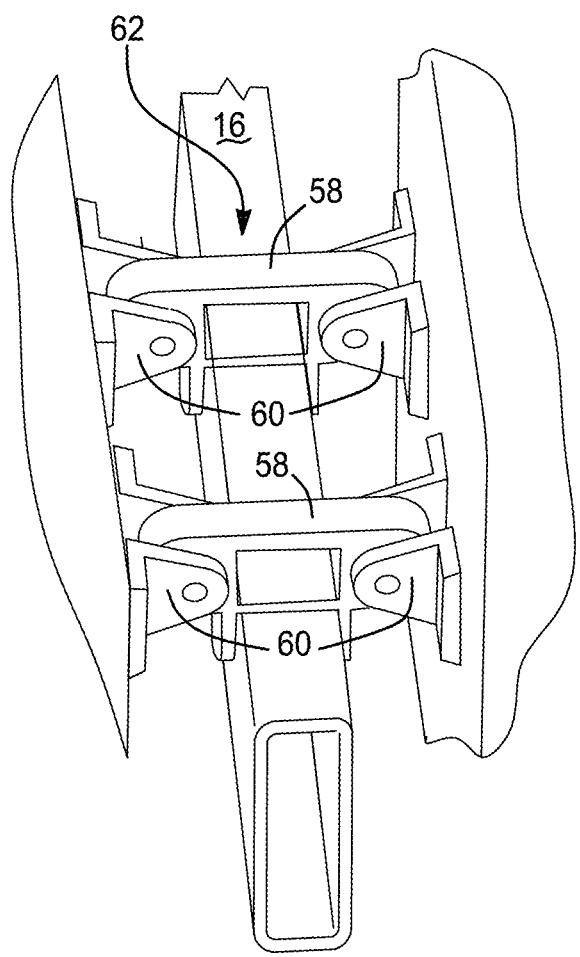
FIG. 17 illustrates a double connection frame mount for a suspended battery connection according to one or more embodiments as shown and described herein.

The components housed within the skateboard 14, including any battery packs, BHV boxes, component boxes, or the like, may be arranged in a suspended manner within the skateboard 14. For example, as illustrated in FIGS. 16 and 17, the components may be connected to portions of the frame 16 and suspended between frame sections. In a single sided mounting strategy illustrated in FIG. 16 components may be mounted and suspended on a single side of a frame section. The single sided frame connection 56 may comprise a frame clamp 58 and a component connection 60 pivotally connected on one side of the frame clamp 58. The double-sided frame connection 62 illustrated in FIG. 17 may comprise a frame clamp 58 and a component connection 60 pivotally connected on both side of the frame clamp 58, to provide suspended connections on both sides of a section of frame 16. It will be appreciated that the illustrated frame clamps 58 and component connections 60 are designed to be easily added and removed by clamping or unclamping from the frame without the need for other connection components. The frame clamps 58 further are able to connect to the frame 16 without interfering with or compromising the flexibility of the frame 16.

Figure 18:
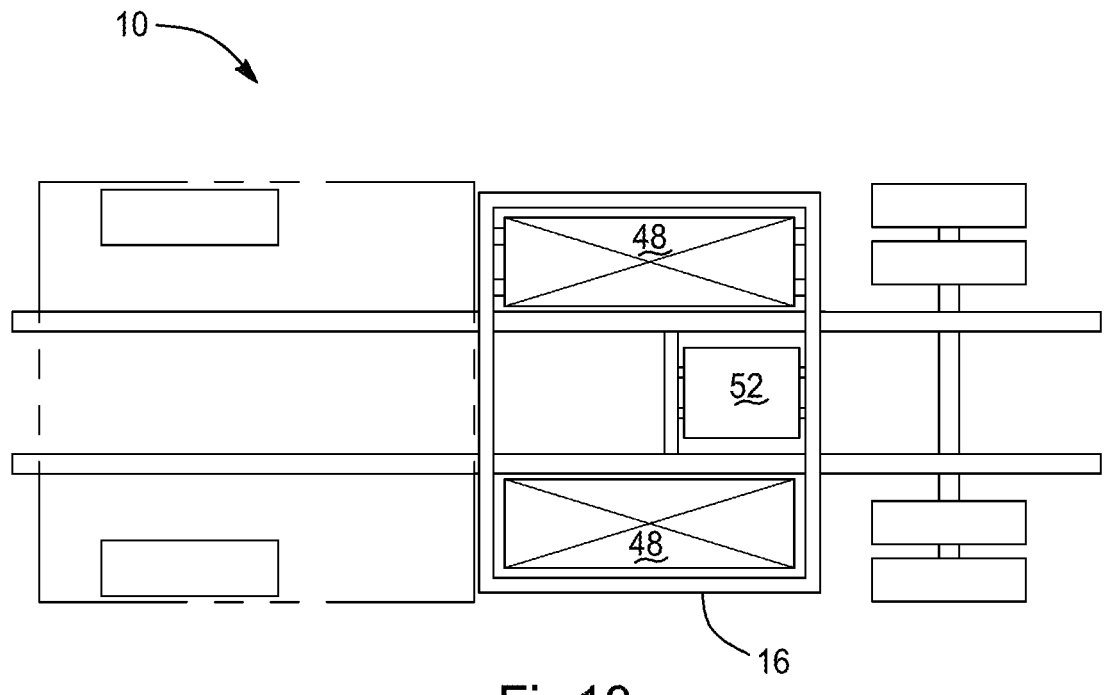
FIG. 18 illustrates a two-battery pack chassis configuration for a skateboard platform of a first size according to one or more embodiments as shown and described herein.
Figure 19:
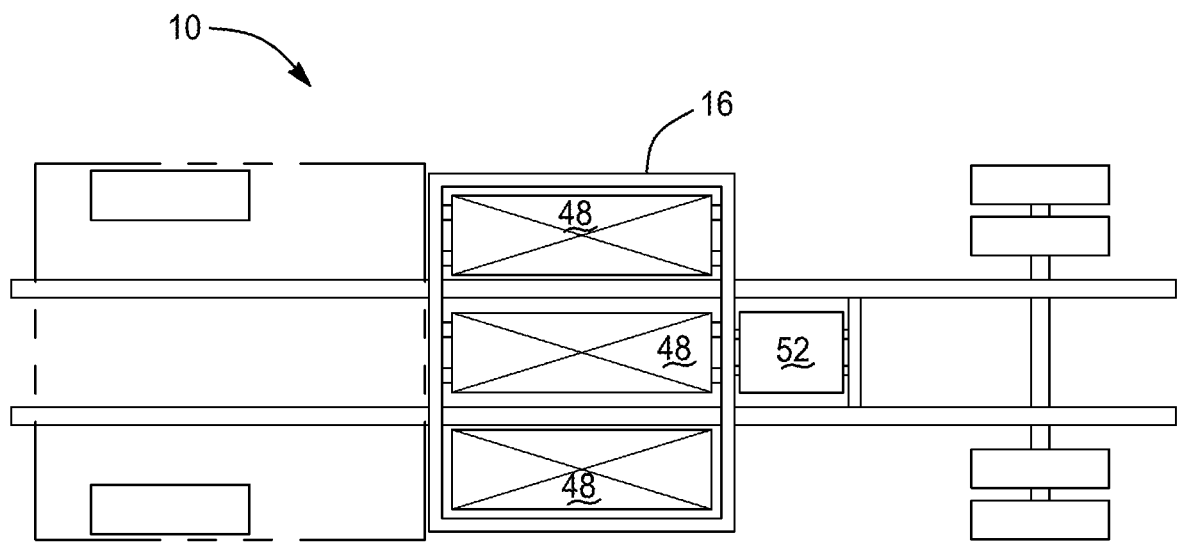
FIG. 19 illustrates a three-battery pack chassis configuration for a skateboard platform; according to one or more embodiments as shown and described herein.
Figure 20:
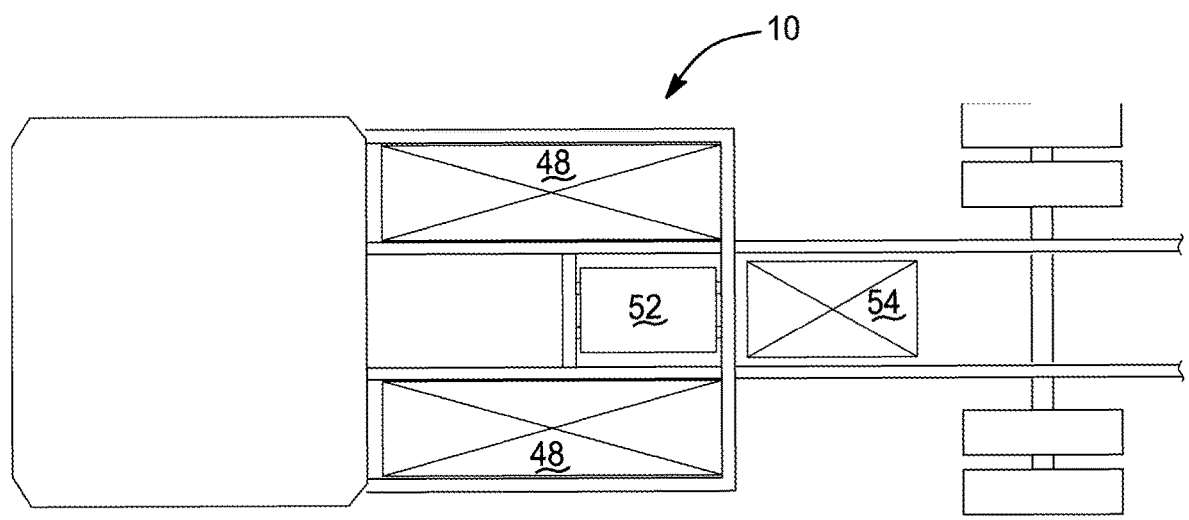
FIG. 20 illustrates a two-battery pack chassis configuration for a skateboard platform of a third size according to one or more embodiments as shown and described herein.

FIGS. 18-20 illustrate various arrangements and configurations of battery packs 48 and other supporting components on a modular vehicle frame 16. FIG. 19 show various size vehicle frames 16. FIG. 18 illustrates battery packs 48 suspended from outer frame sections to balance the weight of the battery packs 48. The BHV 52 is positioned on a central frame section between the battery packs 48. FIG. 19 illustrates a three battery pack 48 configuration. The batter packs 48 are connected to and suspended in three consecutive frame sections, with the BHV positioned in a rear and central frame section adjacent to the battery packs 48. FIG. 20 illustrates a two battery pack configuration with the BHV module 52 positioned between the battery packs 48 and an optional component module 54 positioned behind the BHV module 52. In all of the illustrated configurations, the battery packs 48 are contained within the footprint of the frame and directly surrounded by the frame 16 to create added protections for the battery packs 48 in the event of a collision or other impact event.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

Having thus described the invention, we claim:

1. A modular vehicle comprising:
   an electric chassis, the electric chassis holding at least one battery and at least one motor to power the vehicle, the electric chassis having a planar upper surface formed of a singular structure;
   at least one repositionable module; and
   the planar upper surface of the electric chassis having a plurality of connection pads, the at least one repositionable module configured to connect directly to at least one of the plurality of connection pads of the electric chassis to facilitate an electric, physical, and/or communication connection,
   wherein each of the plurality of connection pads is capable of facilitating an electric, physical, and communication connection.

2. The modular vehicle of claim 1 wherein the electric chassis includes a frame, the planar upper surface connected to the frame.

3. The modular vehicle of claim 1 wherein the plurality of connection pads includes electric connections connecting the electric chassis to the at least one repositionable module.

4. The modular vehicle of claim 1 wherein the plurality of connection pads includes communications connections connecting the electric chassis to the at least one repositionable module.

5. The modular vehicle of claim 1 wherein the plurality of connection pads includes physical connections connecting the electric chassis to the at least one repositionable module.

6. The modular vehicle of claim 5 wherein the physical connection is a lock.

7. The modular vehicle of claim 1 wherein the electrical and communication connections are embedded into the physical connection.

8. The modular vehicle of claim 1 wherein the at least one module is a plurality of modules.

9. A modular vehicle comprising:
   a powered chassis, the powered chassis holding at least one motor to power the vehicle, the powered chassis having a planar upper surface formed of a singular structure;
   at least one repositionable module; and
   the planar upper surface of the powered chassis having a plurality of connection pads, the at least one repositionable module configured to connect directly to at least one of the plurality of connection pads of the powered chassis to facilitate an electric, physical, and/or communication connection,
   wherein each of the plurality of connection pads is capable of facilitating an electric, physical, and communication connection.

10. The modular vehicle of claim 9 wherein the powered chassis includes a frame, the planar upper surface connected to the frame.

11. The modular vehicle of claim 9 wherein the plurality of connection pads includes electric connections connecting the powered chassis to the at least one repositionable module.

12. The modular vehicle of claim 9 wherein the plurality of connection pads includes communications connections connecting the powered chassis to the at least one repositionable module.

13. The modular vehicle of claim 9 wherein the plurality of connection pads includes physical connections connecting the powered chassis to the at least one repositionable module.

14. The modular vehicle of claim 13 wherein the physical connection is a lock.

15. The modular vehicle of claim 9 wherein the electrical and communication connections are embedded into the physical connection.

* * * * *